Patented Jan. 6, 1931

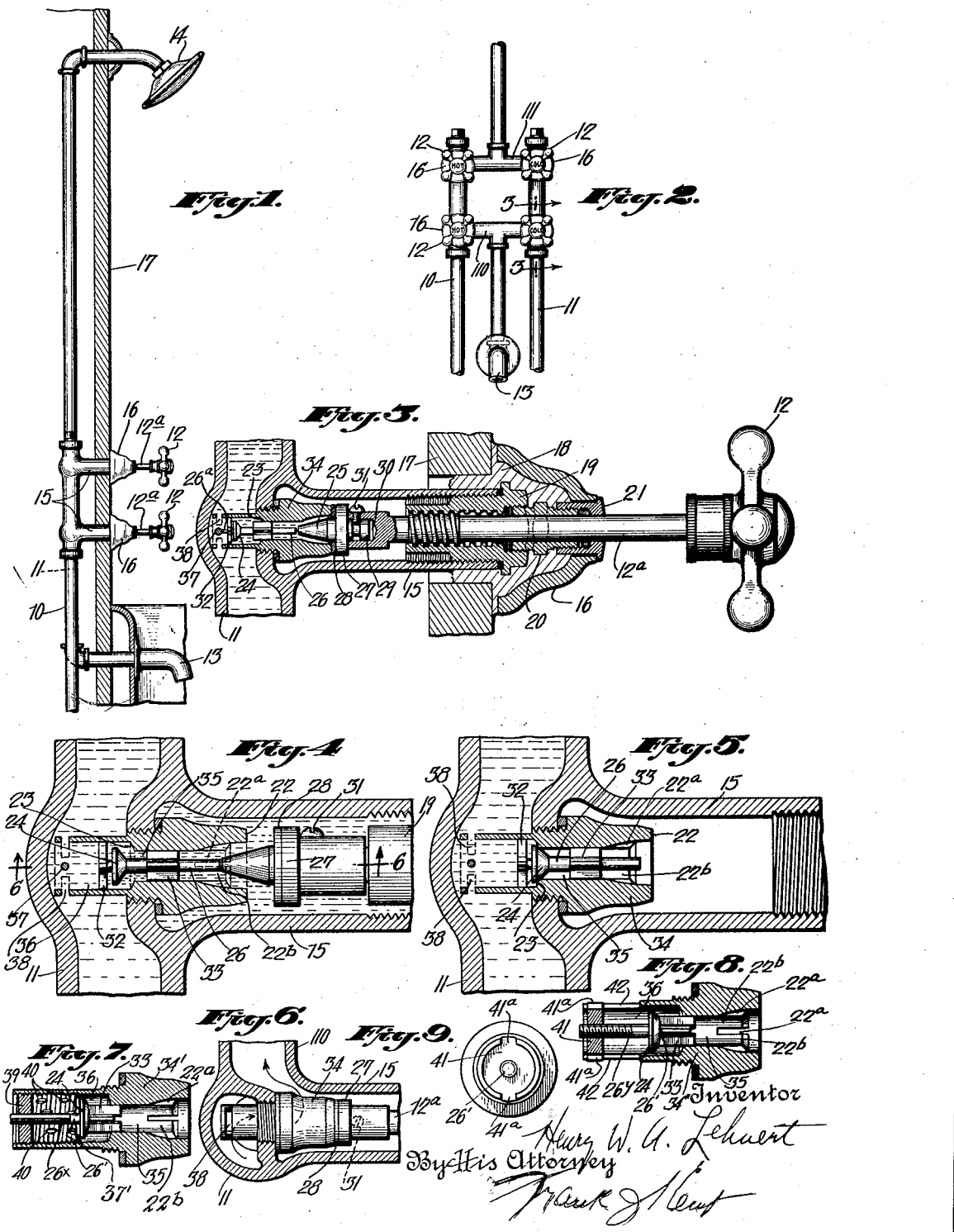

1,787,947

UNITED STATES PATENT OFFICE

HENRY W. A. LEHNERT, OF NEW YORK, N. Y.

AUXILIARY CHECK VALVE

Application filed May 7, 1927. Serial No. 189,477.

This invention relates to plumbing appliances, and more particularly aims to provide a new and improved valve means especially useful for automatically closing a water supply conduit, as for instance one leading to a bath-room faucet, spigot or shower-head, on removal of or injury to the valve handle ordinarily used for opening and closing said valve means.

An object of the invention is to provide a valve means, for use in any fluid supply line, wherein the aforesaid automatic shut-off feature is incorporated, and wherein there is incorporated a valve-member which may be one manually moved relative to its seat while setting the line to fluid-delivery condition at an intended point, and may at the same time be a valve-member functioning when the automatic valve-closing operation occurs. When the invention is thus embodied, such embodiment may be incorporated, practically, reliably, and inexpensively, in modern plumbing, as particularly exemplified in the modern bath-room, where the points of fluid delivery are some distance removed from the locations of the controlling valves.

Another object is to provide a manually operable water-supply or plumbing valve which may incorporate a plurality of valve members which may be set simultaneously, say manually in the ordinary way, as by spiral adjustment of a single threaded stem member carrying the valve handle, for the intended temporary water delivery; and at the same time a valve including a valve-member which automatically closes the valve, immediately on the occurrence of such accidental maladjustment of the parts as would, in the absence of this automatic closing feature, cause or tend to cause leakage or flooding at the place of such maladjustment.

Still another abject is to provide a water-supply valve means wherein a manual device is provided for operating a first valve member to cause the delivery of a supply of water at a given discharge point, and there is provided a second valve member for automatically cutting off the water supply, on unintended disassembly, or abnormal assembly, of said manual device and the first valve.

Another object is to provide, in a fluid valve-means, a valve member which is always automatically urged by the fluid-pressure toward closed condition and which at the same time may be moved relative to its seat by manual means including a faucet handle or other similarly exposed and accessible operating device.

Another object is to provide a water-supply valve including manual operating means and a plurality of valve-members so associated with each other and with the water-supply line that on operation of said manual means one valve member is moved away from its seat, thereby to open the line at one point and simultaneously the other valve member is held against full seating, thereby to maintain said line open at another point.

Still another and more specific object is to provide a water-supply valve means wherein a dislocatable valve member controllable by manual means, and an automatic-closing valve actuated by the water pressure, are provided, to function in such manner that the last-mentioned valve member is non-interferent with the first-mentioned valve member during normal operations, but to insure seating of the automatic valve member by water pressure on dislocation of the first-mentioned valve member.

Various other objects and advantages of the invention than those hereinabove mentioned will be specifically pointed out or will be apparent hereinafter, in the course of the below detailed description of the forms of the invention shown, in the accompanying drawing, as preferred ones of the various possible embodiments of the invention; it being understood, naturally, that such forms are merely illustrative of several of the many possible combinations and arrangements of parts whereby the objects of the invention may be attained, and hence said detailed description of such forms is not to be taken as at all defining or limiting the invention itself. That is to say, the scope of protection contemplated is of course to be taken from the appended claims, interpreted as broadly as is consistent with the prior art.

In the accompanying drawing:

Fig. 1 is a side elevation of a part of a plumbing system serving a bath-room and including wall faucet-handles operable to cause water discharge at a shower-head or tub faucet;

Fig. 2 shows certain of the parts of Fig. 1 in front elevation;

Fig. 3 is mainly a vertical sectional view, on an enlarged scale, taken on 3—3 of Fig. 2;

Fig. 4 is a similar view, but on still a larger scale, showing certain valve parts in a different adjustment;

Fig. 5 is a reproduction of Fig. 4, except that certain valve parts are in still another adjustment and others are absent;

Fig. 6 is a section on line 6—6 of Fig. 4, showing the same collection of valve parts as in Figs. 3, 4 and 5, but in bottom plan;

Fig. 7 is a sectional view showing another embodiment of valve-means according to the invention;

Fig. 8 is a view similar to Fig. 7, showing still another embodiment; and

Fig. 9 is an end elevation of the parts shown in Fig. 8, looking to the right in Fig. 8.

Similar reference characters refer to similar parts throughout the several views.

The embodiments of the invention illustrated in these views are particularly designed for overcoming a certain plumbing trouble, although the invention may be otherwise applied, of course.

This trouble may be briefly explained as follows:

In those water supply systems forming part of the equipment of modern bath-rooms, it is common to employ a piping system such as that shown in Figs. 1 and 2, where hot and cold water supply lines are provided as indicated at 10 and 11, and such lines have therein valve-means operated by faucet handles located some distance ahead of the points of water discharge. In the typical case illustrated, there are four of these handles, as indicated at 12, and two discharge points, one a tub faucet 13 and the other a shower-head 14.

Ordinarily the valve means just referred to are located in line with the faucet handles, and include valve-members controlled solely by the handles and moved toward and away from their seats by spiral movements of the stems 12a on which said handles are fixed. The stems are suitably threadedly mounted within housings extended into branch pipes 15, and the housings are partially contained within or covered over by finishing-fitments 16. Often, also, between the wall 17, and the fitments 16, a mass of plastic material is applied and allowed to set in place, as indicated at 18.

Fig. 3 shows a typical housing for a stem 12a. Here the stem is threaded in the inner end of a long collar 19, which collar is threaded in branch pipe 15; while a gland 20 is threaded in the outer end of the collar and also in a cap 21 in retaining engagement with fitment 16. The arrangement of threads is such that if the stem 12a is turned to move the stem to the right, that is, to unseat any suitable valve-member at the left end of the stem, such stem turning, if carried too far, will unscrew the collar 19 from the branch pipe 15. This is what often actually occurs; causing a flooding through the right end of the branch pipe, and over one or both sides of the wall 17.

The present invention is particularly adapted to insure against any such damage, as will now be explained.

In this connection, see Figs. 3, 4, 5, and 6; representing a form of the invention which may be installed at all four of the valve locations indicated in Fig. 2.

In the first place, while stem 12a, at its inner end, carries, as is usual, a valve-member which is movable by the stem to control the flow of water out of pipe 11 and into the mixing pipe 110 (Figs. 2 and 6), this is not the only valve-member present.

Instead, in the present case, two valve seats are provided, one facing outwardly, toward the faucet handle, as indicated at 22 (Fig. 4), and the other facing inwardly, toward the pipe 10 or 11, as indicated at 23. The valve-member, indicated at 24, which coacts with the last-mentioned valve seat, is part of a floating valve structure, and so arranged as to be always automatically urged toward its seat by the water pressure in pipe 11. Steam 12a is not directly or positively connected with the valve member 24, although operating the handle 12 in valve-opening direction, to advance the stem axially to the right, allows a relative movement between the valve-member 24 and its seat 23 in response to the water pressure, but not sufficiently to affect the water-flow toward seat 22. In order to attain this result, a device is carried on the inner end of the valve stem 12a having a conical extension 25 the smaller end of which is in line with the stem 26 of the floating valve structure.

This conical extension 25 is backed by a disc-portion 27 presenting an annular face carrying a washer 28. Washer 28 constitutes the valve-member for coacting with seat 22; the parts 25 and 27 being integral with a peripherally grooved shank 29 set rotatively in a recess 30 in the enlarged inner end of stem 12a and therein retained by a screw 31. Thus operation of the faucet handle as last described, also moves valve-member 28 off its seat 22, to open up full water-supply communication between pipes 11 and 110.

The floating valve structure is made up of the central stem 26, the valve-member 24 intermediate the ends of the stem, and radially offset ribs or fins 32 and 33.

A nipple or sleeve 34 is screwed into a threaded hole in the wall between pipe 11 and the branch pipe 15, so as to extend on opposite sides of said wall. This sleeve carries within the same the valve seat 23 for the valve-member 24; and to the right of this seat is a bore 35 of smaller diameter, and to the left thereof a bore 36 of larger diameter. The larger bore is a guide for the fins 32, and the smaller bore is a guide for the fins 33 of the floating valve structure. Between the right end of the smaller bore 35, and the valve seat 22, also carried by sleeve 34, is an outwardly flaring substantially conical recess coaxial with the bores 35 and 36, so as to receive completely the conical extension 25 on the inner end of the stem 12a when the parts are arranged as shown in Fig. 3.

As the parts are shown in Fig. 3 (and also in Fig. 6), the valve is in closed condition, so far as the faucet 13 is concerned; because the only way for the water in pipe 11 below the valve to reach the pipe 110 is by passage through the hollow interior of sleeve 34 and thence past valve seat 22 into pipe 110, as indicated by the arrows of Fig. 6. However, in Fig. 3, as will be noted, the valve-member 28 is tight against its seat; and consequently, even though valve-member 24 is maintained at the maximum separation from its seat, water may only flow through pipe 11 above the valve now being described to the similar valve connecting with cross pipe 111 serving the shower-head 14.

Fig. 4 shows the parts as they are disposed when the stem 12a of Fig. 3 is turned to move the same to the intended limit of its travel to the right, to turn on the water relative to faucet 13. Then water may flow from pipe 11 to pipe 110, as indicated in Fig. 4, since both valve-members 28 and 24 are spaced from their seats 22 and 23.

In Fig. 5 is illustrated what happens when too far turning of the stem 12a in the direction last-mentioned, results in an inadvertent removal of stem 12a and the parts directly or indirectly carried thereby, or even in a breaking away of the collar 19 from pipe 15. The water pressure in pipe 11 has snapped the valve-member 24 to instantaneous closure against its seat 23, and a flooding through pipe 15, of water under pressure in pipe 11 below the valve, cannot occur.

It will be noted that sleeve 34 and the floating valve structure therein may be furnished as a complete sub-assembly, by applying at the factory a cross-pin as indicated at 37. Such pin precludes accidental loss of the floating valve structure; and if desired may act as a stop to limit movement of the valve-member 24 away from its seat 23, for instance by suitably prolonging the central stem of the valve-structure as indicated at 26a in Fig. 3.

To insure adequate water flow into bore 36 of sleeve 34, the sleeve may be slotted as indicated at 38; and to insure adequate water flow out of the opposite end of the sleeve, the conical recess at said end is a true conical recess adjacent to valve-seat 22, and as shown best in Figs. 4 and 5, such true recess is fed by slots 22a cut 90° apart around a cylindrical guide-bore in the recess for fins 33, for establishing longitudinal fin-guiding ledges 22b in prolongation of bore 35.

Referring to Figs. 7 and 8, these views, showing somewhat modified sub-assemblies of sleeve and floating valve structure, illustrate very clearly the slots 22a and ledges 22b above referred to; such slots and ledges being here shown as also incorporated in the sleeve 34' of Fig. 7 and in the sleeve 34" of Figs. 8 and 9.

In the form of the invention shown in Fig. 7 and also in the form shown in Figs. 8 and 9, the valve seats 22 and 23, the bores 36 and 35, and the conical recess between the latter and valve seat 22, will all be observed. Also, there is present in each form a floating valve structure including a central stem 26', a valve member 24 and a set of guiding fins 33, all as in Figs. 3, 4, 5 and 6.

In the forms of Figs. 7 and 8, the central stems 26' are not projected outwardly beyond fins 33 as in Fig. 3; but an equivalent of such missing stem-projection may be carried as a part of the stem 12a of Fig. 3, at the inner end thereof.

In Figs. 7 and 8 the central stems 26' are prolonged considerably as indicated at 26x in Fig. 7 and at 26y in Fig. 8. These prolongations 26x and 26y are squared, and threaded, respectively.

In the case of Fig. 7 the squared stem portion 26x is slidable through a square hole in a guide member 39, and a pin 37', similar in function to the pin 37 of Fig. 3, is provided to limit shifting of valve member 24 thus always to maintain fins 33 within bore 35. Then, auxiliary guiding fins, corresponding to the fins 32 of Fig. 3, may be safely omitted. Member 39 is a male nut spirally adjustable in the threaded part of bore 36, and the wall of such bore is provided with a spiral series of apertures 40; so that nut 39 may be set to predetermine a desired water flow past the valve member 24.

In the case of Fig. 8, the threaded stem portion 26y has spirally adjustable thereon a nut 41 provided with diametrically opposed projections 41a slidable along slots 42 cut along the bounding wall of bore 36. This arrangement provides the nut 41, not only as a substitute for auxiliary fins such as are indicated at 32 in Fig. 3, but also as an adjustable balancer for fins 33; particularly when some means (not shown) is provided to limit shifting of valve member 24 so far to the left as to move fins 33 out of bore 35. And if the stop-means last referred to, say a cross-pin like the pin 37 of Fig. 3, is arranged to engage nut 41 rather than the left end of stem portion 26y, the nut may also serve as an adjuster for the intended action of such stop-means. Finally, note that the slots 42 act not only to guide nut projections 41a, but also to provide water-flow passage like the slots 38 of Fig. 3.

Inasmuch as many changes could be made in the above constructions, and many apparently widely different embodiments of the invention could be made without departing from the scope thereof, it is intended that all matter contained in the above description or shown in the accompanying drawings shall be interpreted as illustrative and not in a limiting sense.

It is also to be understood that the language contained in the following claims is intended to cover all the generic and specific features of the invention herein described and all statements of the scope of the invention which, as a matter of language, might be said to fall therebetween.

I claim:

1. An auxiliary valve structure for purposes described, comprising a unitary body externally threaded at an intermediate point of its length for insertion in a threaded aperture, the body having adjacent the threaded portion a shoulder adapted for compression of packing against a wall at said aperture, and the body also having a passage therethrough and also having one end formed as a seat for a main valve with which the auxiliary valve cooperates, a stem in said passage, guide flanges on the stem engaging the passage wall, and a valve on the stem cooperating with a valve seat formed in the passage, the body having a tubular extension with inner diameter larger than that of the passage, communicating therewith and accommodating the valve with peripheral clearance when the valve is in open position.

2. An auxiliary valve structure for purposes described, comprising a unitary body externally threaded at an intermediate point of its length for insertion in a threaded aperture, the body having adjacent the threaded portion a shoulder adapted for compression of packing against a wall at said aperture, and the body also having a passage therethrough and also having one end formed as a seat for a main valve with which the auxiliary valve cooperates, a stem in said passage, guide flanges on the stem engaging the passage wall, and a valve on the stem cooperating with a valve seat formed in the passage, the body having a tubular extension with inner diameter larger than that of the passage, communicating therewith and accommodating the valve with peripheral clearance when the valve is in open position, said extension having slots in its wall for lateral admission of liquid.

3. An auxiliary valve structure for purposes described, comprising a unitary body externally threaded at an intermediate point of its length for insertion in a threaded aperture, the body having adjacent the threaded portion a shoulder adapted for compression of packing against a wall at said aperture, and the body also having a passage therethrough and also having one end formed as a seat for a main valve with which the auxiliary valve cooperates, a stem in said passage, guide flanges on the stem engaging the passage wall, and a valve on the stem cooperating with a valve seat formed in the passage, the body having a tubular extension with inner diameter larger than that of the passage, communicating therewith and accommodating the valve with peripheral clearance when the valve is in open position, the stem having adjacent the valve, spaced members engaging the extension wall.

4. An auxiliary valve structure for purposes described, comprising a body externally threaded at an intermediate point of its length for insertion in a threaded aperture, the body having a passage therethrough and also having one end formed as a seat for a main valve with which the auxiliary valve cooperates, a stem in said passage, guide flanges on the stem engaging the passage wall, and a valve on the stem cooperating with a valve seat formed in the passage, the passage having, adjacent the valve seat first named, longitudinal channels providing for increased liquid flow.

In testimony whereof I affix my signature.

HENRY W. A. LEHNERT.